United States Patent
Kimura et al.

(10) Patent No.: US 7,729,458 B2
(45) Date of Patent: Jun. 1, 2010

(54) SIGNAL DECODING APPARATUS, SIGNAL DECODING METHOD, PROGRAM, AND INFORMATION RECORD MEDIUM

(75) Inventors: Ryota Kimura, Tokyo (JP); Hiroshi Harada, Tokyo (JP); Ryuhei Funada, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 827 days.

(21) Appl. No.: 11/557,827

(22) Filed: Nov. 8, 2006

(65) Prior Publication Data

US 2007/0116157 A1 May 24, 2007

(30) Foreign Application Priority Data

Nov. 9, 2005 (JP) ............................ 2005-325414

(51) Int. Cl.
*H04B 7/02* (2006.01)
*H04L 1/02* (2006.01)

(52) U.S. Cl. ..................... 375/347; 375/267
(58) Field of Classification Search ........... 375/260, 375/267, 340, 346, 347
See application file for complete search history.

(56) References Cited

U.S. PATENT DOCUMENTS 6,654,429 B1 * 11/2003 Li ............................ 375/316
6,959,052 B2 10/2005 Harada et al.
7,324,437 B1 * 1/2008 Czylwik et al. ............. 370/210
2002/0126774 A1 9/2002 Harada et al.
2006/0045194 A1 * 3/2006 Athanasios et al. ......... 375/260
2006/0114814 A1 * 6/2006 Kasami et al. ............. 370/208

FOREIGN PATENT DOCUMENTS

JP 2002-271293 9/2002

* cited by examiner

*Primary Examiner*—David B Lugo
(74) *Attorney, Agent, or Firm*—K&L Gates LLP

(57) ABSTRACT

Signal decoding apparatus, signal decoding method, program, and information record medium are provided and can accomplish not only high-speed and high-capacity communication, but high-accuracy decoding. An initial channel estimation section 31 estimates an initial channel with a pilot symbol added at the beginning of each packet. After a replica of a transmission symbol is generated, for a reception signal vector, CCI components for L transmission antennas are generated. A CCI canceller 33 removes the CCI components from the reception signal vector. After the reception symbol vector from which the CCI components had been removed has been obtained, a division device 34 obtains an instantaneous estimation value. An update condition determination section 35 detects deterioration of a channel response accuracy based on a threshold value. An instantaneous estimation value whose SNR has been determined to be insufficient is discarded. An averaging circuit 36 outputs a channel response estimation matrix at time t+1 obtained by an averaging process and supplies the matrix to a symbol decoding section 13.

11 Claims, 5 Drawing Sheets

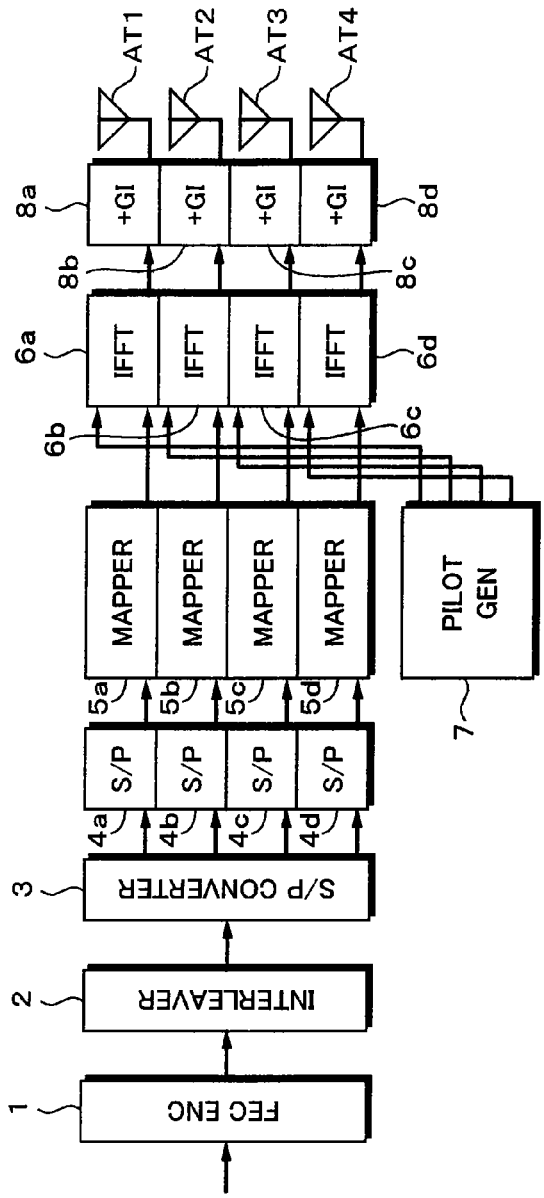
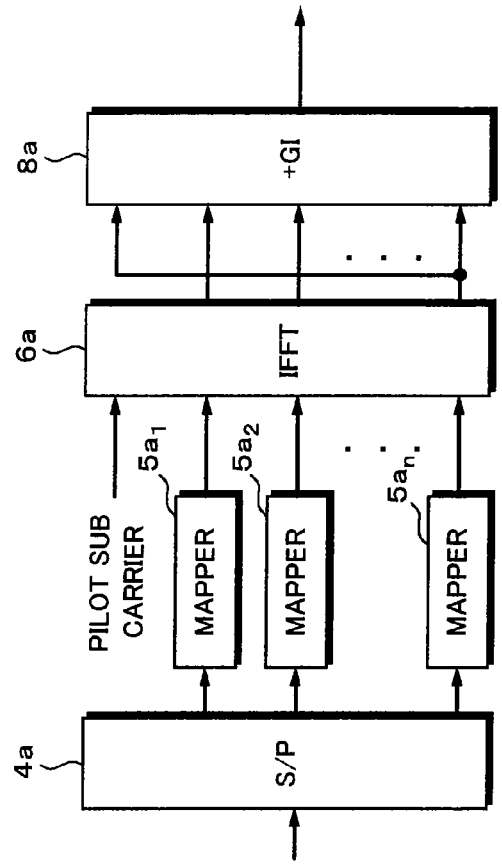
Fig. 1A
Fig. 1B

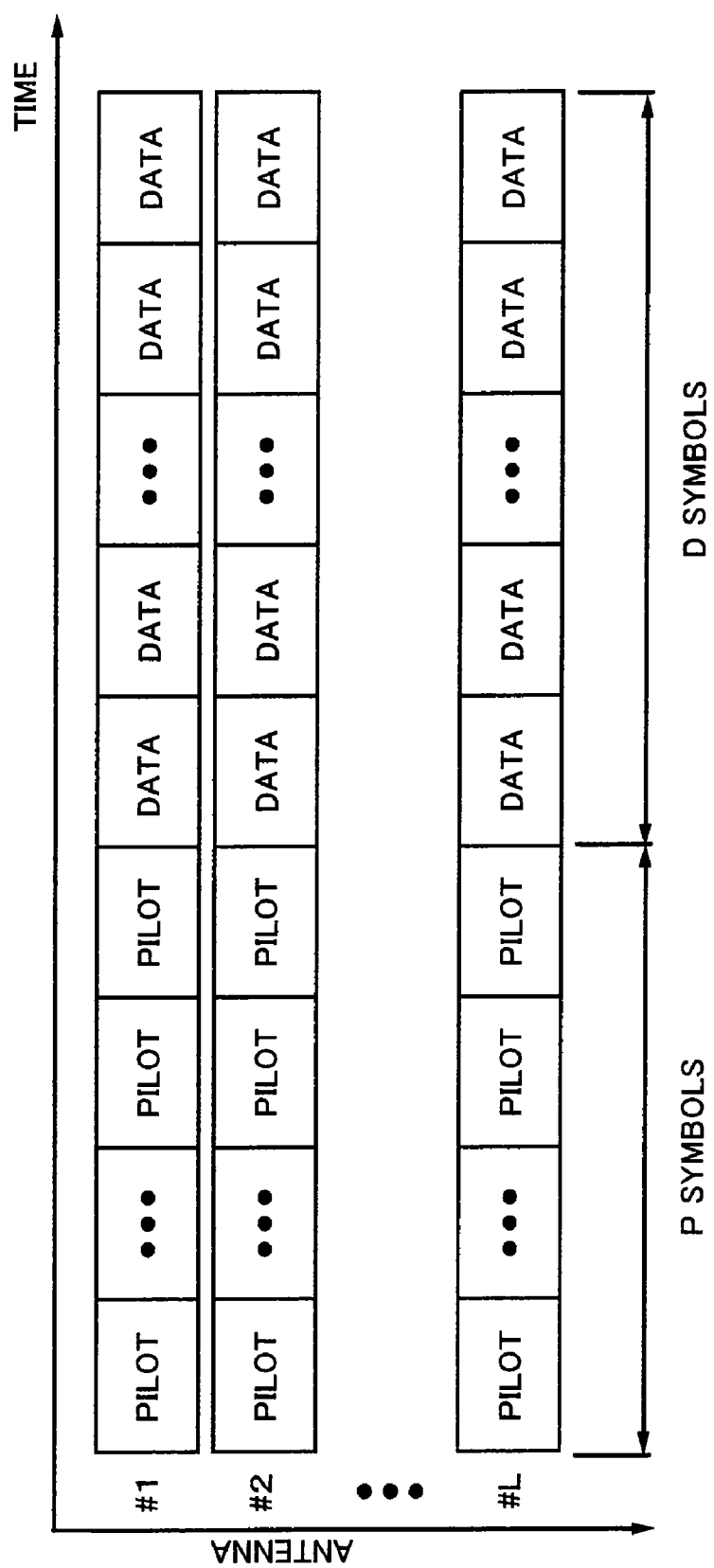

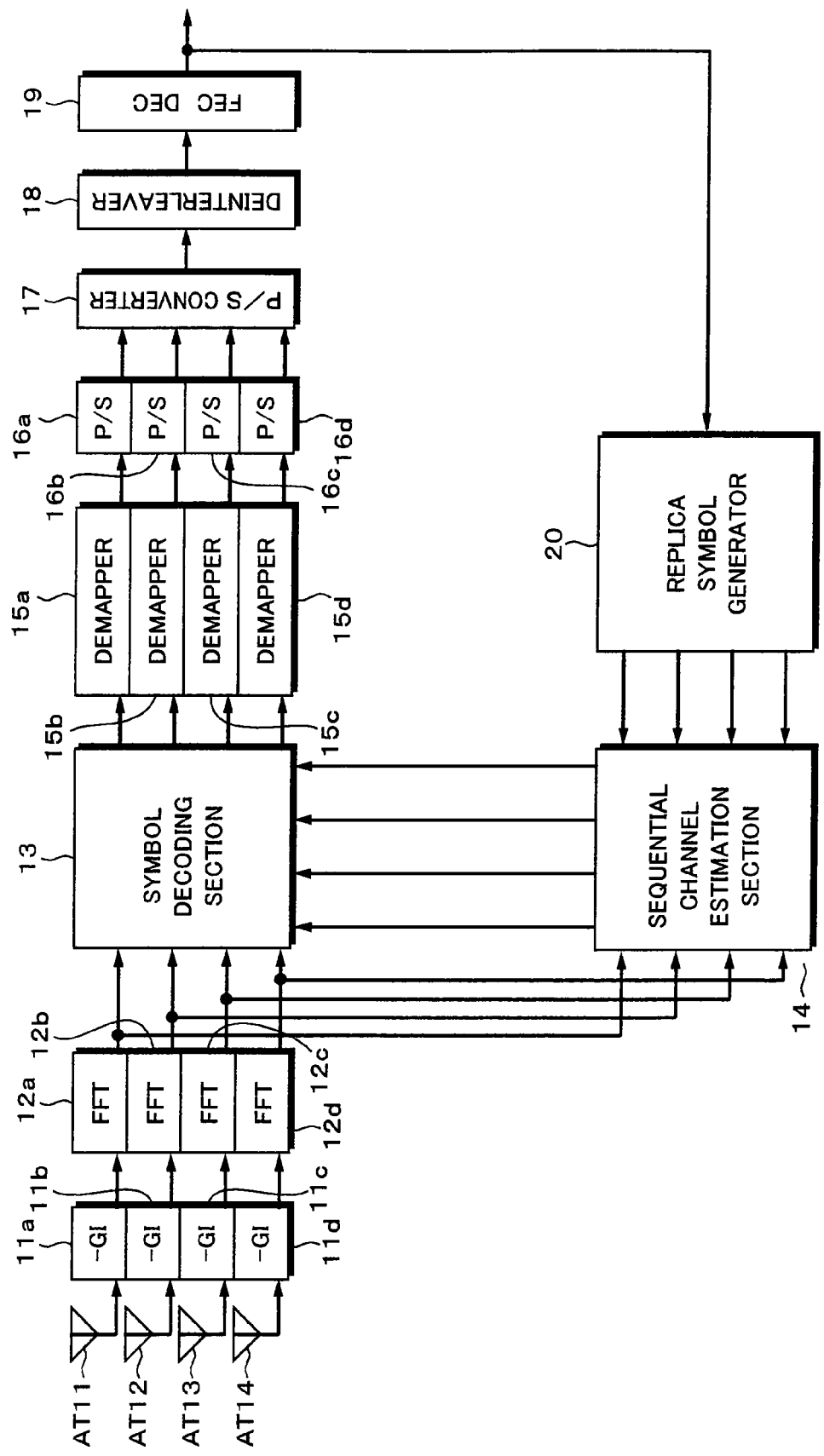

SIGNAL DECODING APPARATUS, SIGNAL DECODING METHOD, PROGRAM, AND INFORMATION RECORD MEDIUM

CROSS REFERENCES TO RELATED APPLICATIONS

The present application claims priority to Japanese Patent Application No. 2005-325414 filed in the Japanese Patent Office on Nov. 9, 2005, the entire contents of which is being incorporated herein by reference.

BACKGROUND

The present application relates to a signal decoding apparatus, a signal decoding method, a program, and an information record medium that accomplish for example high-speed, large-capacity mobile communications.

In recent years, as the number of accesses to the Internet through wireless communications has increased, needs of high-speed and large-capacity packet communications have drastically become large. When high-speed wireless data communications are made, since the signal bandwidths become large, communication quality tends to deteriorate due to frequency selective fading.

Against this problem, Orthogonal Frequency Division Multiplex (OFDM) is a communication system that has an excellent frequency fading resistance. IEEE 802.11a/g system, which is a widely used wireless LAN system, performs packet communications according to OFDM. However, wireless LAN is a system expected to communicate at hotspots in offices, which are in a semi-stationary state. Thus, in high-speed mobile environments such as cars, since changes of fading channels are not correctly followed up, communication characteristics deteriorate.

As one of countermeasures to enhance the resistance against a radio transmission environment in a high-speed mobile communication state, signals distorted through multi-path fading are compensated by estimating a radio fading channel. With Channel Estimation (CE) symbols inserted into transmitted signals and received signals, changes of fading channels are estimated. Based on the estimated results, signals are compensated. This countermeasure is described in Japanese Patent Laid-Open Publication No. 2002-271293.

In next-generation mobile wireless access systems, maximum transmission rates of several hundred Mbps to several Gbps are being accomplished. As a technology that realizes such high transmission rates along with high spectral efficiency, Space Division Multiplexing (SDM) is being spotlighted.

SDM is a transmission system of which a transmitter uses multiple antennas, transmits different signals from these antennas, and spatially multiplexes the signals. With this multiplexing, transmission rates proportional to the number of transmission antennas can be obtained without necessity of widening frequency bandwidths.

As a factor that affects transmission performance in SDM, there are signal detection algorithms used for receivers. These algorithms are mainly categorized as two types, one of which is spatial filtering based on Zero-Forcing (ZF) and Minimum Mean Square Error (MMSE) criteria and other of which is Maximum Likelihood Detection (MLD). The former has a merit of which the amount of calculation is small and a demerit of which the transmission capacity is low. In contrast, MLD has a merit of which the transmission capacity is excellent and a demerit of which the amount of calculation is huge.

For MLD, a technique that keeps as much transmission capacity as possible and reduces the amount of calculation has been proposed. The inventor of the present patent application has proposed a signal detection algorithm that separates SDM signals according to Multiple-QR-Decomposition (Multi-QRD).

As another important factor of SDM, there is a channel estimation for a receiver. The foregoing signal detection algorithms operate based on channel responses among transmission and reception antennas. Thus, the accuracies of channel estimations of the algorithms that estimate channel responses largely affect the operations thereof. With respect to channel estimations, many approaches have been made. In particular, many channel estimations using pilot symbols have been proposed.

When SDM is applied to a mobile wireless communication system, as a terminal travels, channels change due to high-speed fading, resulting in a new problem for channel estimations. When changes of channels are not able to be ignored against a time period of transmission signals, errors of channel estimations using only pilot symbols become large in the signal time period. As a result, there is a possibility of which transmission characteristics deteriorate. The foregoing related art estimates only a single radio fading channel.

SUMMARY

In view of the foregoing, it would be desirable to provide a signal decoding apparatus, a signal decoding method, a program, and an information record medium that allow SDM to accurately operate even in high-speed fading environments.

According to an embodiment, there is provided a signal decoding apparatus. The signal decoding apparatus includes a signal input section, a signal decoding section, and a channel response estimation section. The channel response estimation section includes an initial channel estimation section, a replica generation section, a co-channel interference component cancellation section, a calculation section, and a supplying section. The signal input section inputs M mixed signals of which L transmission signals which have been obtained from a predetermined information signal and which are independent from each other have been mixed. The signal decoding section decodes the M mixed signals into L separated signals corresponding to the L transmission signals. The channel response estimation section estimates in parallel a channel response matrix made of M rows times L columns used in the signal decoding section for at least part of the L transmission signals. The initial channel estimation section initially estimates an element of the channel response matrix based on a known symbol in the M mixed signals. The replica generation section performs a transmission process for the L separated signals such that transmission signal replicas of the L transmission signals are generated. The co-channel interference component cancellation section cancels a co-channel interference component with the transmission signal replicas and the mixed signals. The calculation section obtains an instantaneous channel response estimation value from a signal of which the co-channel interference component has been cancelled and the transmission signal replicas. The supplying section obtains an instantaneous estimation value which satisfies a predetermined update condition against the instantaneous channel response estimation value and supplies a time-average value of the obtained instantaneous evaluation values as an element of the channel response matrix to the signal decoding section.

According to an embodiment, there is provided a signal decoding method. In the signal decoding method, M mixed signals of which L transmission signals which have been obtained from a predetermined information signal and which are independent from each other have been mixed are input. The M mixed signals are decoded into L separated signals corresponding to the L transmission signals. A channel response matrix made of M rows times L columns used at the signal decoding step is estimated in parallel for at least part of the L transmission signals. An element of the channel response matrix is initially estimated based on a known symbol in the M mixed signals. A transmission process is performed for the L separated signals such that transmission signal replicas of the L transmission signals are generated. A co-channel interference component is cancelled with the transmission signal replicas and the mixed signals. An instantaneous channel response estimation value is obtained from a signal of which the co-channel interference component has been cancelled and the transmission signal replicas. An instantaneous estimation value which satisfies a predetermined update condition against the instantaneous channel response estimation value is obtained. A time-average value of the obtained instantaneous evaluation values is supplied as an element of the channel response matrix to the signal decoding step.

According to an embodiment, there are provided a program which causes a computer to execute a signal decoding method and a record medium on which the program is stored. In the signal decoding method, M mixed signals of which L transmission signals which have been obtained from a predetermined information signal and which are independent from each other have been mixed are input. The M mixed signals are decoded into L separated signals corresponding to the L transmission signals. A channel response matrix made of M rows times L columns used at the signal decoding step is estimated in parallel for at least part of the L transmission signals. An element of the channel response matrix is initially estimated based on a known symbol in the M mixed signals. A transmission process is performed for the L separated signals such that transmission signal replicas of the L transmission signals are generated. A co-channel interference component is cancelled with the transmission signal replicas and the mixed signals. An instantaneous channel response estimation value is obtained from a signal of which the co-channel interference component has been cancelled and the transmission signal replicas. An instantaneous estimation value which satisfies a predetermined update condition against the instantaneous channel response estimation value is obtained. A time-average value of the obtained instantaneous evaluation values is supplied as an element of the channel response matrix to the signal decoding step.

The receiving method and receiving apparatus according to an embodiment allow channel estimations with respect to individual antennas to be performed in parallel. Thus, the channel estimations can be performed at high speed. In addition, according to the present invention, it is not necessary to obtain an inverse matrix of a transmission signal. As a result, the receiving method and receiving apparatus can stably operate regardless of whether there is an inverse matrix.

Additional features and advantages are described herein, and will be apparent from, the following Detailed Description and the figures.

BRIEF DESCRIPTION OF THE FIGURES

FIG. 1A and FIG. 1B are block diagrams showing the structure of a transmitter according to an embodiment of the present invention.

FIG. 2 is a schematic diagram showing the structure of a transmission signal according to an embodiment of the present invention.

FIG. 3 is a block diagram showing the structure of a receiver according to an embodiment of the present invention.

DETAILED DESCRIPTION

Figure 4:
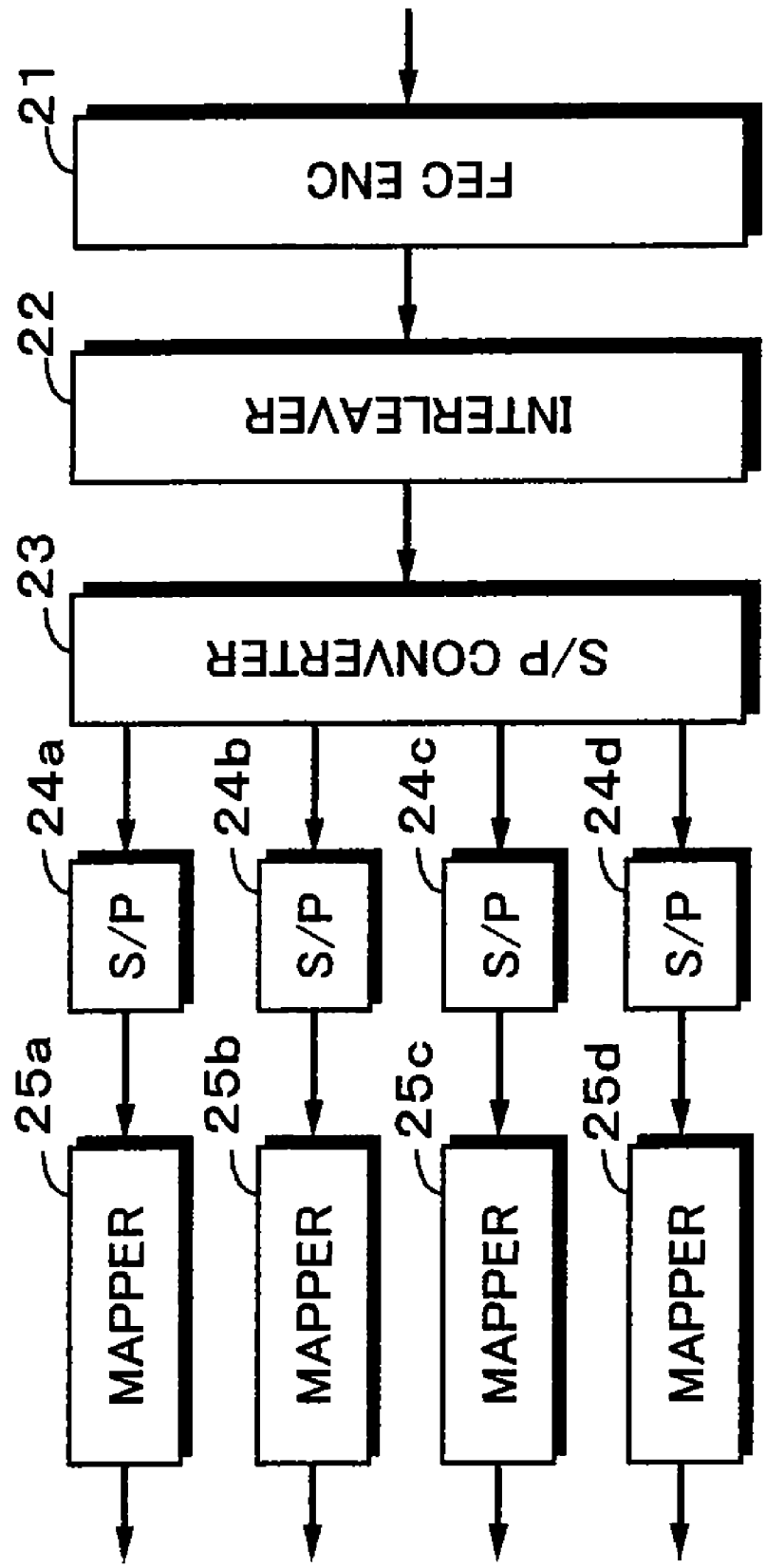
FIG. 4 is a block diagram showing the structure of a replica symbol generator according to the structure of a part of the receiver.

Next, with reference to the accompanying drawing, an embodiment of the present application will be described. FIG. 1A and FIG. 1B show an example of a transmitter used in a communication system according to an embodiment of the present invention. A transmission bit sequence is input to an Forward Error Correction (FEC) encoder 1. The FEC encoder 1 encodes the input sequence with an error correction code. An output of the FEC encoder 1 is supplied to a block interleaver 2. The block interleaver 2 performs an interleave process for each OFDM symbol. An output of the interleaver 2 is supplied to an S/P converter 3. The S/P converter 3 converts serial data into parallel data. The S/P converter 3 generates transmission data sequences corresponding to L transmission antennas, for example, four transmission antennas AT1, AT2, AT3, and AT4.

Instead, the S/P converter 3 may be disposed on the input stage. In this case, FEC encoders 1 and block interleavers 2 corresponding to the four parallel data sequences may be disposed.

S/P converters 4a, 4b, 4c, and 4d connected to the S/P converter 3 divide a data sequence into multiple data sequences. Data sequences outputted from the S/P converters 4a to 4d are supplied to mappers 5a, 5b, 5c, and 5d, respectively. The mappers 5a to 5d each perform a digital modulation (such as Quadrature Amplitude Modulation (QAM) or Phase Shift Keying (PSK)).

Outputs of the mappers 5a to 5d are supplied to Inverse Fast Fourier Transform (IFFT) sections 6a, 6b, 6c, and 6d. The IFFT sections 6a to 6d generate time domain waveforms. Pilot symbols are supplied from a pilot symbol generator 7 to the IFFT sections 6a to 6d. As a result, pilot symbols are added to the time domain waveforms.

Outputs of the IFFT sections 6a to 6d are supplied to Guard Interval (GI) addition sections 8a, 8b, 8c, and 8d, respectively. The GI addition sections 8a to 8d add guard intervals to data outputted from the IFFT sections 6a to 6d at intervals of a symbol time period. Outputs of the GI addition sections 8a to 8d are supplied to transmission antennas AT1, AT2, AT3, and AT4 through power amplifiers (not shown). The transmission antennas AT1, AT2, AT3, and AT4 transmit signals outputted from the GI addition sections 8a to 8d as radio waves.

The S/P converters 4a to 4d divide data into channels corresponding to the number of sub carriers according to the OFDM modulation system. The structure of the S/P converter 4a is shown in FIG. 1B. Assuming that the number of sub carriers according to OFDM is denoted by n, the S/P converter 4a forms n channels of parallel data. N channels of data sequences are supplied to mappers $5a_1$ to $5a_n$, respectively. The IFFT section 6a generates an OFDM signal from the data sequences outputted from the mappers $5a_1$ to $5a_n$. The guard interval addition section 8a adds a guard interval to each OFDM symbol of the OFDM signal.

FIG. 2 shows the structure of output signals of L transmission antennas. Transmission signals are composed of known symbols (referred to as a pilot) used to estimate an initial channel and data symbols that store transmission data. In FIG. 2, vertical axis represents transmission antenna numbers (1, 2, . . . , L), whereas horizontal axis represents time base. FIG. 2 shows the structure of data of one packet. P symbols at the beginning of one packet (these symbols are OFDM symbols) are a pilot. D symbols preceded by P symbols are data symbols. The packet structure shown in FIG. 2 is just an example. Thus, the output signals of the L transmission antennas may have other than the packet structure shown in FIG. 2.

FIG. 3 shows the structure of a receiver according to this embodiment of the present invention. Reception signals received from M reception antennas, for example four reception antennas AT11, AT12, AT13, and AT14, are supplied to guard interval removal sections 11a, 11b, 11c, and 11d. The guard interval removal sections 11a to 11d remove guard intervals from the reception signals at timing of received OFDM symbols.

This embodiment of the present invention relates to Multiple Input Multiple Output (MIMO) that is a technology that forms multiple communication channel with L transmission antennas and M reception antennas to improve spectral efficiency and communication quality and that performs SDM transmission causing different data sequences to be transmitted at the same time and at the same frequency through these antennas.

Output signals of the guard interval removal sections 11a to 11d are supplied to Fast Fourier Transform (FFT) sections 12a, 12b, 12c, and 12d. The FFT sections 12a to 12d convert time domain signals into frequency domain signals. Outputs of the FFT sections 12a to 12d are composed of parallel data sequences corresponding to n sub carriers according to OFDM.

Data symbols of outputs of the FFT sections 12a to 12d are supplied to a symbol decoding section 13. Pilot symbols of outputs of the FFT sections 12a to 12d are supplied to a sequential channel estimation section 14. The sequential channel estimation section 14 estimates an initial channel with a reception pilot signal (known symbols) and a transmission known symbol replica. The initial channel is properly estimated on the basis of the structure of the transmission known symbols.

After estimating the initial channel, the symbol decoding section 13 detects a transmission signal on the basis of the outputs of the FFT sections 12a to 12d and the estimation value of the initial channel. In other words, in the SDM transmission technology, the reception side estimates a channel response matrix (also referred to as a transfer coefficient matrix) H of MIMO channels formed in combination of all antennas on the transmission side and the reception side based on a known signal and so forth and separates the reception signals into data sequences transmitted from the individual transmission antennas.

It is thought that as signal detection algorithms, there are zero-forcing method, minimum mean square error method, maximum likelihood detection, and modifications thereof. According to this embodiment of the present invention, any one of these signal detection algorithms can be used. For example, Multi-QRD is used as a signal detection algorithm. Supplied to the symbol decoding section 13 is an output of the sequential channel estimation section 14. The symbol decoding section 13 separates the data symbols outputted from the FFT sections 12a to 12d into data sequences transmitted from the individual transmission antennas.

These transmission data sequences are supplied to demappers 15a, 15b, 15c, and 15d, which perform a demapping process as a reverse process of the mappers. The demappers 15a to 15d demodulate data that were digitally modulated on the transmission side. The demappers 15a to 15d can perform a hard decision process or a soft decision process as the demapping process. When FEC codes are used, the soft determination process allows decoding effects of FEC codes to be improved.

Outputs of the demappers 15a to 15d are supplied to P/S converters 16a, 16b, 16c, and 16d, respectively. The P/S converters 16a to 16d combine channels corresponding to the number of sub carriers according to OFDM in one channel. In addition, a P/S converter 17 combines output data sequences of the P/S converters 16a to 16d in one reception data sequence.

An output of the P/S converter 17 is supplied to an FEC decoder 19 through a deinterleaver 18 that performs a deinterleave process corresponding to the interleave process preformed on the transmission side. The FEC decoder 19 decodes FEC codes and obtains transmission bit sequences.

When the transmission side has a structure that performs an interleave process and an FEC encoding process for individual data sequences corresponding to the number of transmission antennas, the reception side also has a structure of which outputs of the P/S converters 16a to 16d are connected to a corresponding number of deinterleavers, the deinterleavers are connected to a corresponding number of FEC decoders, and outputs of the FEC decoders are combined into one sequence by the P/S converter.

Next, the sequential channel estimation section 14, which is a feature of this embodiment of the present invention, will be described. Sequential channel estimation is a technique of sequentially and repeatedly updating a channel estimation value in such a manner that a replica symbol generator 20 generates a transmission symbol replica from a transmission bit sequence decoded by a receiver. The sequential channel estimation is performed for each sub carrier.

FIG. 4 shows the structure of the replica symbol generator 20. A decoded transmission bit sequence is supplied to an interleaver 22 through an FEC encoder 21. An output of the interleaver 22 is supplied to an S/P converter 23. The S/P converter 23 divides data outputted from the interleaver 22 into four data sequences corresponding to the number of transmission antennas. The four divided data sequences are supplied to S/P converters 24a, 24b, 24c, and 24d, respectively. Outputs of the S/P converters 24a to 24d are supplied to mappers 25a, 25b, 25c, and 25d, respectively. The mappers 25a to 25d output replica symbols.

The replica symbol generator 20 performs the same process as that of the transmitter described with reference to FIG. 1A and FIG. 1B for a decoded transmission bit sequence and generates transmission symbol replicas. The generated transmission symbol replicas are input to the sequential channel estimation section 14.

Figure 5:
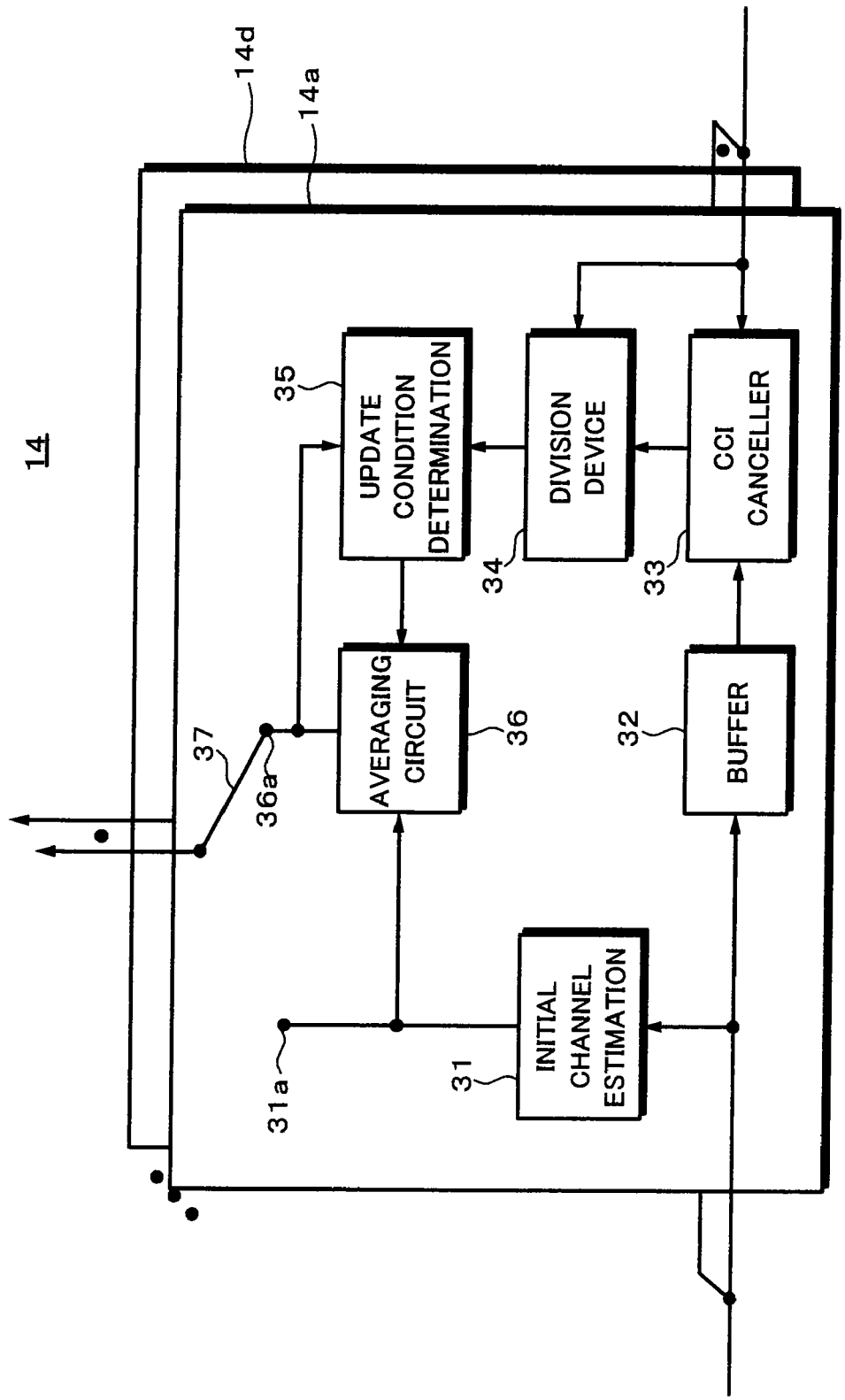
FIG. 5 is a block diagram showing the structure of a sequential channel estimation section according to an embodiment of the present invention.

FIG. 5 shows an example of the structure of the sequential channel estimation section 14. The sequential channel estimation section 14 has sequential channel estimation sections 14a to 14d, which have the same structure and which correspond to L transmission antennas, for example four transmission antennas. Thus, channel estimation values about transmission symbols received from the individual transmission antennas can be updated and obtained in parallel.

A sequential channel estimation section 14 corresponding to one transmission antenna has an initial channel estimation section 31, a buffer 32, a co-channel interference (CCI) canceller 33, a division device 34, an update condition determination section 35 that detects deterioration of for example signal power-to-noise power ratio (SNR) as an update condition, an averaging circuit 36, and a selector 37.

Next, according to an embodiment, namely the sequential channel estimation process, will be described in detail. First, a reception signal model will be described. It is assumed that time after fast Fourier transform of an m-th antenna ($1 \leq m \leq M$) of a receiver is denoted by t and a reception symbol of a k-th sub carrier ($1 \leq k \leq K$) is denoted by $r_m(t, k)$. A reception symbol vector having M $r_m(t, k)$s' as elements can be expressed by formula (1) that follows.

$$r(t, k) = [r_1(t, k) \ldots r_M(t, k)]^T = H(t, k)s(t, k) + n(t, k) \quad (1)$$

Terms of formula (1) are an M-row, L-column channel response matrix expressed by formula (2) that follows, a column vector of a channel response matrix expressed by formula (3), transmission symbols transmitted from first to L-th transmission antennas expressed by formula (4), and noise components of first to M-th reception antennas.

$$H(t,k)=[h_1(t,k) \ldots h_L(t,k)] \quad (2)$$

$$h_1(t,k)=[h_{1,1}(t,k) \ldots h_{M,1}(t,k)]^T \quad (3)$$

$$s(t,k)=[s_1(t,k) \ldots s_L(t,k)]^T \quad (4)$$

$$n(t,k)=[n_1(t,k) \ldots n_M(t,k)]^T \quad (5)$$

In other words, $s_1(t, k)$ represents a transmission symbol transmitted from an l-th transmission antenna ($1 \leq l \leq L$) of the transmitter. $h_{m,l}(t, k)$ represents a channel response between the l-th transmission antenna and an m-th reception antenna. $n_m(t, k)$ represents a noise component of the m-th reception antenna. It is assumed that in a channel model that does not correlate l and m of $h_{m,l}(t, k)$, no multi-path inter-symbol interference occurs. In addition, it is assumed that $n_m(t, k)$ has an additive white gauss noise of average=0 and dispersion=$\sigma^2$.

When an initial channel is estimated with a pilot symbol added at the beginning of each packet of a transmission signal, the selector 37 has been connected to an output terminal 31a of the initial channel estimation section 31. After an initial channel has been estimated and a first data symbol of the signal has been demodulated, the selector 37 is connected to an output terminal 36a of the averaging circuit 36.

"$\hat{h}_{m,l}(t, k)$" represents an estimation value estimated by the receiver for a channel response $h_{m,l}(t, k)$ between the l-th transmission antenna and the m-th reception antenna. Likewise, "$\hat{h}_l(t, k)$" represents an estimation value of a channel response vector. Moreover, "$\hat{s}_l(t,k)$" represents a replica and its vector of a transmission symbol generated by the replica symbol generator 20.

After a replica of a transmission symbol is generated, a CCI component of a reception signal vector is generated for each transmission antenna and the CCI component is removed from the reception signal vector by the CCI canceller 33. As expressed by formula (6) that follows, a CCI component corresponding to a symbol transmitted from the l-th transmission antenna is obtained by multiplying an estimation value of which l-th column vector of a channel response matrix composed of estimation values of individual elements at time t is substituted with 0 vector by the transmission symbol replica. When the condition of M=L=4 is satisfied, the channel response matrix is composed of four rows times four columns. Sequential channel estimation sections 14a to 14d perform a process of obtaining channel responses of individual columns.

$$\Gamma_l(t,k)=\hat{H}_{(l)}(t,k)s(t,k) \quad (6)$$

An estimation value of a channel response vector is expressed by formula (7) that follows.

$$\hat{H}_{(l)}(t,k)=[\hat{h}_1(t,k) \ldots \hat{h}_{l-1}(t,k) 0 \hat{h}_{l+1}(t,k) \ldots \hat{h}_L(t,k)] \quad (7)$$

CCI components obtained by formula (6) are generated for ($1 \leq l \leq L$). By subtracting the CCI components from a reception symbol vector at time t, a reception symbol vector of which CCI components are removed for ($1 \leq l \leq L$) expressed by formula (8) that follows is obtained.

$$rc,l(t,k)=r(t,k)-\Pi(t,k) \quad (8)$$

Assuming that the receiver has correctly estimated a channel and generated a replica symbol, namely an estimation value of a channel response matrix matches itself and an estimation value of a transmission symbol vector matches itself, as expressed by formula (9) that follows, it is clear that the reception symbol vector is composed of only a transmission symbol vector.

$$r_{c,l}(t,k) \approx h_l(t,k)s_l(t,k) \quad (9)$$

After the reception symbol vector from which the CCI component had been removed has been obtained, as expressed by formula (8), when the division device 34 divides the reception symbol vector by the transmission symbol replica vector, an instantaneous channel response estimation value (hereinafter referred to as an instantaneous estimation value) is obtained. In this example, an instantaneous estimation value is obtained for each vector (refer to formula (3)) composed of a channel response value for the l-th transmission antenna is estimated. When "$\hat{h}_l(t,k)$" represents an instantaneous estimation value of a channel response value, the instantaneous estimation value is obtained by formula (10) that follows.

$$\hat{h}_l(t,k)=r_{c,l}(t,k)/\hat{s}_l(t,k) \quad (10)$$

The value obtained by formula (10) is an instantaneous estimation value obtained at intervals of a symbol time period. When these instantaneous estimation values are used as correct values, channel response estimation values whose accuracies instantaneously deteriorate may be used. As a result, there is a possibility of which reception characteristics deteriorate. When amplitudes of sub carriers according to OFDM deteriorate on the reception side, it is thought that instantaneous estimation values may be largely affected by noise, resulting in deteriorating their accuracies. To easily detect deterioration of estimation accuracies against such a problem, the update condition determination section 35 detects deterioration of a channel response accuracy on the basis of a predetermined threshold value.

In this detection method, an instantaneous estimation value at time t obtained by formula (10) is compared with that at preceding time t−1. Based on the compared result, deterioration of SNR of the estimation value is detected. When the comparison is made, for example, numeric values are squared and then their absolute values are obtained (hereinafter, these obtained values may be referred to as absolute squared values). An output of the update condition determination section 35 is expressed by formula (11) that follows.

$$\bar{h}_{m,l}(t, k) = \begin{cases} \tilde{h}_{m,l}(t, k) & \dfrac{|\tilde{h}_{m,l}(t, k)|^2}{|\hat{h}_{m,l}(t-1, k)|^2} \geq \lambda_{th}^2 \\ \hat{h}_{m,l}(t-1, k) & \text{otherwise} \end{cases} \quad (11)$$

In formula (11), $\lambda_{th}$ represents a parameter of a threshold value of a real number and satisfies the condition of ($0 \leq \lambda_{th} \leq 1$). For example, $\lambda_{th}$ is set to 0.2. Formula (11) denotes that when the ratio of the squared absolute value of an instantaneous estimation value at particular time and that at immediately preceding time exceeds a threshold value, it is determined that SNR of the instantaneous estimation value be sufficient and that otherwise (when the ratio does not exceed the threshold value) SNR be insufficient. An output of the update condition determination section 35 is supplied to the averaging circuit 36. In this case, an instantaneous estimation value whose SNR has been determined to be insufficient is discarded. Thus, an instantaneous estimation value at time t is not supplied to the averaging circuit 36. As a result, an instantaneous estimation value at time t−1 is kept supplied to the averaging circuit 36.

$$|\text{Re}\{\tilde{h}_{m,l}(t, k)\}| + |\text{Im}\{\tilde{h}_{m,l}(t, k)\}| \geq$$
$$\underline{\lambda_{th}[|\text{Re}\{\tilde{h}_{m,l}(t-1, k)\}| + |\text{Im}\{\tilde{h}_{m,l}(t-1, k)\}|]}$$
$$\text{otherwise}$$

The update condition determination section 35 can determine not only an instantaneous evaluation value expressed by formula (11), but that expressed by formula (12) or formula (13).

$$\bar{h}_{m,l}(t, k) = \begin{cases} \tilde{h}_{m,l}(t, k) & |\tilde{h}_{m,l}(t, k)| \geq \lambda_{th}|\hat{h}_{m,l}(t-1, k)| \\ \hat{h}_{m,l}(t-1, k) & \text{otherwise} \end{cases} \quad (12)$$

$$\bar{h}_{m,l}(t, k) = \quad (13)$$
$$\begin{cases} \tilde{h}_{m,l}(t, k) & \begin{aligned}|\text{Re}\{\tilde{h}_{m,l}(t, k)\}| + |\text{Im}\{\tilde{h}_{m,l}(t, k)\}| \geq \\ \lambda_{th}[|\text{Re}\{\hat{h}_{m,l}(t-1, k)\}| + |\text{Im}\{\hat{h}_{m,l}(t-1, k)\}|]\end{aligned} \\ \hat{h}_{m,l}(t-1, k) & \text{otherwise} \end{cases}$$

In formula (13), Re{a} and Im{a} denote a real part and an imaginary part of complex number a.

An instantaneous estimation value obtained by formula (11), formula (12), or formula (13) contains an estimation error due to noise. To reduce influence of a noise component, the averaging circuit 36 performs an averaging process. When an averaging process expressed by formula (14) that follows is performed, a channel response estimation matrix at time t+1 is output from the averaging circuit 36 and supplied to the symbol decoding section 13 through the selector 37.

$$\hat{H}(t+1, k) = \frac{1}{N_{av}} \sum_{d=t-N_{ac}+1}^{t} \overline{H}(d, k) \quad (14)$$

In formula (14), $N_{av}$ represents the average number of symbols on time base. When an instantaneous estimation value at time t is smaller than $N_{av}$, the averaging process is performed only for instantaneous estimation values that have been obtained at that time. For example, the instantaneous evaluation value $N_{av}$ is 8.

When the processes expressed by formula (6) to formula (14) are performed in parallel by the sequential channel estimation sections 14a to 14d, a channel response matrix can be obtained. When the channel estimation process is successively performed at intervals of a symbol time period until a data symbol sequence has been completed, channels can be estimated while time-variations of channels are followed up. Thus, a reception operation can be accurately preformed under a high speed mobile environment such as a car ride or a train ride.

TABLE 1

| calculation item | amount of calculation | example of numeric value |
| --- | --- | --- |
| generation of CCI component | 4LM(L − 1)K(D − 1) | 2654208 |
| calculation of instantaneous estimation value | 6LMK(D − 1) | 1327104 |
| detection of deterioration of channel | 5LMK(D − 1) | 1105920 |

Examples of numeric values: L = M = 4, K = 768, D = 19

Next, the amount of calculation in the update process of the sequential channel estimation section according to the foregoing embodiment is evaluated. Table 1 shows the number of multiplications of real numbers per slot in updating a channel estimation value. In table 1, L represents the number of transmission antennas, M represents the number of reception antennas, K represents the number of sub carriers, and D represents the number of data OFDM symbols per slot. In table 1, assuming that one multiplication of two complex numbers includes four multiplications of real numbers and that one division of two complex numbers includes six multiplications of real numbers, the amount of calculation is obtained. "Example of numeric value" represents the number of multiplications of real numbers in the case of L=M=4 K=768, and D=19.

Various embodiments have been specifically described. However, the present application is not limited to such embodiments, where, various modifications thereof may be made. For example, channel responses of all transmission antennas may not be estimated in parallel, but of a part thereof. In addition, embodiments of the present invention are not limited to a multi-carrier transmission system such as OFDM, but may be applied to a communication system in combination of narrow band single carrier transmission system and SDM and a communication system in combination of a wide band single carrier transmission system, which uses a frequency domain equalization, and SDM.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A signal decoding apparatus comprising:
   signal input means for inputting M mixed signals of which L transmission signals which have been obtained from a predetermined information signal and which are independent from each other have been mixed;

signal decoding means for decoding the M mixed signals into L separated signals corresponding to the L transmission signals; and channel response estimation means for estimating in parallel a channel response matrix made of M rows times L columns used in the signal decoding means for at least part of the L transmission signals, wherein the channel response estimation means includes:

(a) initial channel estimation means for initially estimating an element of the channel response matrix based on a known symbol in the M mixed signals, wherein said signal decoding means detects a transmission signal based on said initially estimated element;

(b) replica generation means for performing a transmission process for the L separated signals such that transmission signal replicas of the L transmission signals are generated;

(c) co-channel interference component cancellation means for cancelling a co-channel interference component with the transmission signal replicas and the mixed signals;

(d) calculation means for obtaining an instantaneous channel response estimation value from a signal of which the co-channel interference component has been cancelled and the transmission signal replicas; and (e) means for:
(i) obtaining an instantaneous estimation value which satisfies a predetermined update condition against the instantaneous channel response estimation value; and
(ii) supplying a time-average value of the obtained instantaneous evaluation values as an element of the channel response matrix to the signal decoding means.

2. The signal decoding apparatus of claim 1, wherein:
(a) the M mixed signals are mixtures of transmission signals transmitted from L transmission antennas; and
(b) the signal input means receives signals from M reception antennas.

3. The signal decoding apparatus of claim 1, wherein the L transmission signals are modulation information signals to which multiple signals obtained by converting the information signal from a serial signal into parallel signals have been modulated.

4. The signal decoding apparatus of claim 1, wherein the L transmission signals are modulated information signals according to a multi-carrier transmission system which uses orthogonal frequencies to which multiple signals obtained by converting the information signal from a serial signal into parallel signals have been modulated.

5. A signal decoding method comprising:
inputting M mixed signals of which L transmission signals which have been obtained from a predetermined information signal and which are independent from each other have been mixed;
decoding the M mixed signals into L separated signals corresponding to the L transmission signals;
estimating in parallel a channel response matrix made of M rows times L columns used at the signal decoding step for at least part of the L transmission signals;
initially estimating an element of the channel response matrix based on a known symbol in the M mixed signals;
detecting a transmission signal based on said initially estimated element;
performing a transmission process for the L separated signals such that transmission signal replicas of the L transmission signals are generated;
cancelling a co-channel interference component with the transmission signal replicas and the mixed signals;
obtaining an instantaneous channel response estimation value from a signal of which the co-channel interference component has been cancelled and the transmission signal replicas; and
obtaining an instantaneous estimation value which satisfies a predetermined update condition against the instantaneous channel response estimation value; and
supplying a time-average value of the obtained instantaneous evaluation values as an element of the channel response matrix to the signal decoding step.

6. The signal decoding method of claim 5, wherein:
(a) the M mixed signals are mixtures of transmission signals transmitted from L transmission antennas; and
(b) the signal input step is performed by receiving signals from M reception antennas.

7. The signal decoding method of claim 5, wherein the L transmission signals are modulation information signals to which multiple signals obtained by converting the information signal from a serial signal into parallel signals have been modulated.

8. The signal decoding method of claim 5, wherein the L transmission signals are modulated information signals according to a multi-carrier transmission system which uses orthogonal frequencies to which multiple signals obtained by converting the information signal from a serial signal into parallel signals have been modulated.

9. A computer readable medium storing instructions which causes a computer to:
(a) inputting M mixed signals of which L transmission signals which have been obtained from a predetermined information signal and which are independent from each other have been mixed;
(b) decode the M mixed signals into L separated signals corresponding to the L transmission signals;
(c) estimate in parallel a channel response matrix made of M rows times L columns used at the signal decoding step for at least part of the L transmission signals;
(d) initially estimate an element of the channel response matrix based on a known symbol in the M mixed signals;
(e) detect a transmission signal based on said initially estimated element;
(f) perform a transmission process for the L separated signals such that transmission signal replicas of the L transmission signals are generated;
(g) cancel a co-channel interference component with the transmission signal replicas and the mixed signals;
(h) obtain an instantaneous channel response estimation value from a signal of which the co-channel interference component has been cancelled and the transmission signal replicas; and
(i) obtain an instantaneous estimation value which satisfies a predetermined update condition against the instantaneous channel response estimation value and
(j) supply a time-average value of the obtained instantaneous evaluation values as an element of the channel response matrix to the signal decoding step.

10. A computer readable storage medium on which a program is stored, the program causing a computer to execute a signal decoding method, comprising the steps of:

inputting M mixed signals of which L transmission signals which have been obtained from a predetermined information signal and which are independent from each other have been mixed;

decoding the M mixed signals into L separated signals corresponding to the L transmission signals;

estimating in parallel a channel response matrix made of M rows times L columns used at the signal decoding step for at least part of the L transmission signals;

initially estimating an element of the channel response matrix based on a known symbol in the M mixed signals;

detecting a transmission signal based on said initially estimated element;

performing a transmission process for the L separated signals such that transmission signal replicas of the L transmission signals are generated;

cancelling a co-channel interference component with the transmission signal replicas and the mixed signals;

obtaining an instantaneous channel response estimation value from a signal of which the co-channel interference component has been cancelled and the transmission signal replicas;

obtaining an instantaneous estimation value which satisfies a predetermined update condition against the instantaneous channel response estimation value; and supplying a time-average value of the obtained instantaneous evaluation values as an element of the channel response matrix to the signal decoding step.

11. A signal decoding apparatus, comprising:

a signal input section which inputs M mixed signals of which L transmission signals which have been obtained from a predetermined information signal and which are independent from each other have been mixed;

a signal decoding section which decodes the M mixed signals into L separated signals corresponding to the L transmission signals; and a channel response estimation section which estimates in parallel a channel response matrix made of M rows times L columns used in the signal decoding section for at least part of the L transmission signals, wherein the channel response estimation section includes:

(a) an initial channel estimation section which initially estimates an element of the channel response matrix based on a known symbol in the M mixed signals, wherein said signal decoding section detects a transmission signal based on said initially estimated element;

(b) a replica generation section which performs a transmission process for the L separated signals such that transmission signal replicas of the L transmission signals are generated;

(c) a co-channel interference component cancellation section which cancels a co-channel interference component with the transmission signal replicas and the mixed signals;

(d) a calculation section which obtains an instantaneous channel response estimation value from a signal of which the co-channel interference component has been cancelled and the transmission signal replicas; and (e) a supplying section which:

(i) obtains an instantaneous estimation value which satisfies a predetermined update condition against the instantaneous channel response estimation value; and (ii) supplies a time-average value of the obtained instantaneous evaluation values as an element of the channel response matrix to the signal decoding section.

* * * * *